(12) United States Patent
Allen et al.

(10) Patent No.: US 7,395,594 B2
(45) Date of Patent: Jul. 8, 2008

(54) APPARATUS AND METHOD FOR THE INSTALLATION OF A STATOR CORE INTO A POWER GENERATOR

(75) Inventors: David Allen, Longwood, FL (US); Jim Cook, Orlando, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 406 days.

(21) Appl. No.: 11/031,792

(22) Filed: Jan. 7, 2005

(65) Prior Publication Data

US 2005/0235479 A1    Oct. 27, 2005

Related U.S. Application Data

(60) Provisional application No. 60/565,307, filed on Apr. 26, 2004.

(51) Int. Cl.
*H02K 15/02* (2006.01)

(52) U.S. Cl. .............................. 29/596; 29/598; 29/732; 310/42; 310/254

(58) Field of Classification Search ........... 29/596–598, 29/732–736, 739, 729; 310/214, 254, 259, 310/42–43, 270
See application file for complete search history.

(56) References Cited

U.S. PATENT DOCUMENTS

| | | | | |
|---|---|---|---|---|
| 3,512,024 A | * | 5/1970 | Papa | ............................ 310/88 |
| 3,809,234 A | * | 5/1974 | Kurick | ........................ 206/448 |
| 3,940,648 A | | 2/1976 | Wielt et al. | |
| 4,318,218 A | * | 3/1982 | Nelson | ........................ 29/596 |
| 4,401,217 A | | 8/1983 | Blatt | |
| 4,425,523 A | | 1/1984 | Detinko et al. | |
| 4,661,734 A | * | 4/1987 | Capuano et al. | ................ 310/89 |
| 4,916,803 A | | 4/1990 | Estrada | |
| 5,006,748 A | * | 4/1991 | Wintermute | ................. 310/258 |
| 5,136,195 A | | 8/1992 | Allen, III et al. | |
| 5,875,540 A | | 3/1999 | Sargeant et al. | |
| 6,088,904 A | * | 7/2000 | Keck et al. | ..................... 29/596 |
| 6,104,116 A | | 8/2000 | Fuller et al. | |
| 6,321,439 B1 | * | 11/2001 | Berrong et al. | ................ 29/760 |
| 6,346,760 B1 | * | 2/2002 | Boardman, IV | ............. 206/448 |
| 6,448,686 B1 | | 9/2002 | Dawson et al. | |
| 6,548,928 B2 | | 4/2003 | Walko et al. | |
| 6,687,981 B2 | * | 2/2004 | Hook | ........................ 310/259 |
| 2002/0070629 A1 | | 6/2002 | Dawson et al. | |
| 2002/0070631 A1 | | 6/2002 | Dawson et al. | |
| 2002/0182034 A1 | | 12/2002 | Meyer et al. | |
| 2003/0222530 A1 | | 12/2003 | Hediger et al. | |

FOREIGN PATENT DOCUMENTS

| EP | 0 320 252 A2 | 6/1989 |
|---|---|---|
| FR | 2 756 545 A1 | 6/1998 |

\* cited by examiner

*Primary Examiner*—Minh Trinh

(57) ABSTRACT

The present invention comprises a method and apparatus for installing a stator core into a power generator 1 that comprises assembling the stator core inside of a container 60, and then moving the container to the power generator. The container is horizontally aligned with the power generator, and the stator core is transferred from the container to the power generator.

11 Claims, 4 Drawing Sheets

APPARATUS AND METHOD FOR THE INSTALLATION OF A STATOR CORE INTO A POWER GENERATOR

CROSS-REFERENCE TO RELATED APPLICATIONS

This invention claims priority to U.S. Provisional application 60/565,307, filed Apr. 26, 2004, entitled Methods and Apparatuses for Assembling Generator Stator Cores, which is incorporated herein by reference. This invention is further related to US applications: Method and Apparatus of the Mounting of and Circumferential Displacement of Radial Forces in a Stator Core Assembly, by Sargeant et al.; Horizontal Assembly of Stator Core using Keybar Extensions, by Sargeant et al.; Horizontal Assembly of Stator Core using a Central Rail Structure by Majernik et al.; all filed herewith and all incorporated herein by reference.

FIELD OF THE INVENTION

The present invention relates to power generators, and more specifically stator cores. More particularly, the invention relates to the transfer of a pre-assembled stator core into stator frame.

BACKGROUND

The generator stator core is the largest single component in the train of a turbine generator set. The stator cores are generally manufactured from thousands of laminations of relatively thin steel plates which are stacked, pressed and clamped together into the large cylindrical form of the stator core. The clamping is necessary to accommodate variations in thickness of the stock steel plate laminations, commonly referred to as crowns. Improperly clamped laminations can result in plate vibration during generator operation, which results from magnetic impulses or core elliptical dilation.

Typically, the stator core is assembled from the steel plates directly at the final installation site. However, the large size of the stator core and the need for proper clamping results in stator core manufacturing difficulties, including generous floor space and high crane requirements. The manufacture of stator cores via the traditional methods result in manufacturing lead time and other associated manufacturing difficulties. For example, if the core is stacked directly in the stator frame, the frame must be delivered to the site before any manufacturing steps can occur. Additionally, intermediate core pressing equipment is needed to press and clamp the steel plates together at incremental lengths. If, on the other hand, the stator core is manufactured in an external fixture, the external fixture itself adds to the manufacturing costs and requires additional floor space on site and still requires the use of heavy cranes.

U.S. Pat. No. 5,875,540 by Sargeant, which is incorporated herein by reference, overcame some of the problems with the prior art by first assembling a number of laminations into a distinct set, referred to as a donut, and then stacking these donuts to form a stator core. This saved great amounts of time over assembling the laminations individually, and produced a stator core with less flaws.

When the individual laminations, or the set of laminations in a donut, are installed into a core, they engage what are referred to as keybars. Keybars are essentially rods that run the internal length of the stator core and provide a hook-in spot for the laminations. FIG. 1 illustrates a stator frame that is empty of any laminations. The keybars 6 run the internal length of the stator frame 2, and are generally attached to the frame through stator support rings 4.

The size of laminations and resulting stator core can vary, but a typical stator core lamination has a weight of 3.6 lbs (1.6 kg). The results in a weight per inch of core of 1530 lbs/in (1740 kg/cm). For a core length of 225 inches (563 cm), the total weight will be approximately 344,250 lbs (156,477 kg).

In the prior art, when generators need their cores replaced, the only way to accomplish this has been to strip out the old core and then re-stack the new core lamination by lamination. Since the generators are large, immobile objects, each lamination needs to be horizontally inserted into position by hand. This is a very time consuming effort, which requires that the generator be off-line for long periods of time. What is needed is a better way of adding a new core to an existing generator frame.

SUMMARY OF THE INVENTION

With the foregoing in mind, methods and apparatuses consistent with the present invention facilitate the placement of assembled stator cores into existing generator frames. Typically when a stator core needs to be installed into a stator frame, each lamination needs to be stacked into position individually. This is a time consuming process, which is prone to causing imperfections in the stacking of the stator core. The present invention reduces these problems by providing a container that holds a pre-assembled stator core.

The pre-assembled core is shipped to the stator frame in the container. The stator core is then transferred to the stator frame by aligning the container with the stator frame and sliding the core into position. This method and apparatus may also be used on partially assembled stator cores, and segments of stator cores referred to as donuts. The laminations may be assembled within the container itself, or assembled outside of the container and then inserted into it.

These and other objects, features, and advantages in accordance with the present invention are provided in one embodiment by a method of installing a stator core in a power generator that comprises assembling the stator core inside of a container, and then moving the container to the power generator. The container is horizontally aligned with the power generator, and the stator core is transferred from the container to the power generator.

In another particular embodiment, partial stator cores are divided into multiple shipping containers. In a related embodiment, the multiple shipping containers are horizontally aligned at both ends of a stator frame, and the stator core is assembled from both ends of the stator frame.

In another embodiment, the present invention provides for an apparatus for the horizontal placement of a stator core within a stator frame. This apparatus comprises a container, and the container comprises an internal space capable of holding the stator core, and multiple keybars arraigned along the internal space capable of securing the stator core within the internal space. The container is capable of being aligned with a stator frame and the stator core that is disposed within the container is horizontally transferable to the stator frame.

In a particular embodiment, the apparatus further comprises keybar extensions, where the keybar extensions bridge the container and the stator frame. In another particular embodiment a central rail structure is provided, where the central rail structure is capable of supporting and aiding in the movement of at least one of laminations, donuts and a stator core within the container. In a related embodiment, the apparatus further comprises both a central rail structure and keybar extensions.

In a particular embodiment, the apparatus further comprises support rings, where the support rings are capable of applying a radial force to the multiple keybars. In another particular embodiment, the apparatus further comprises external hooking members for aiding in the transport of the container. In still another particular embodiment donuts and stator cores are capable of being assembled within the container.

BRIEF DESCRIPTION OF THE FIGURES

The invention is explained in more detail by way of example with reference to the following drawings.

DETAILED DESCRIPTION OF THE INVENTION

Figure 1:
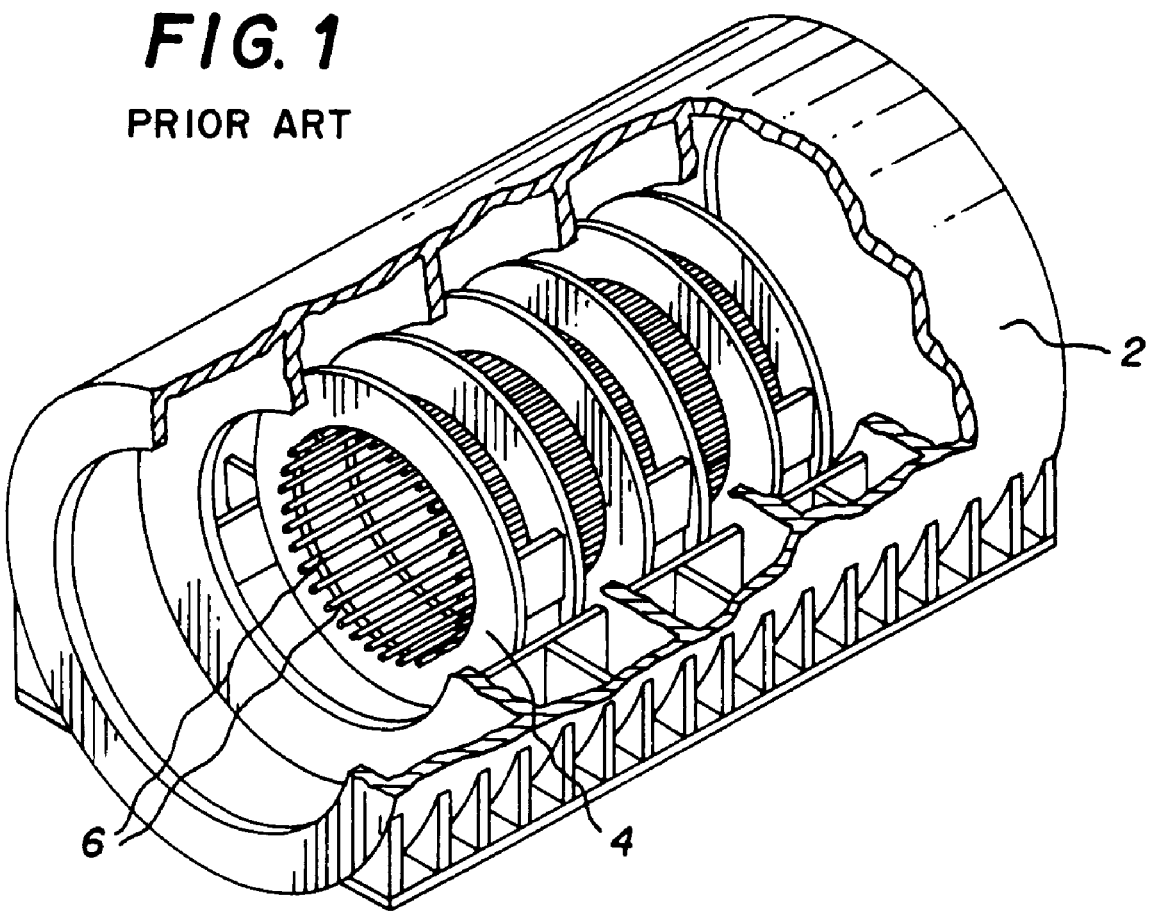
FIG. 1 illustrates a typical stator frame with keybars that has not had the stator core yet assembled.

The present invention provides for a method and apparatus for the placement of a pre-assembled stator core into a stator frame using a container. The pre-assembled stator core may be fully or partially assembled, and the stator frame may be new, or part of a pre-existing power generator. The present invention will also function with stator core segments, referred to as donuts.

A stator core comprises a plurality of stacked laminations. To build a stator core, the laminations need to be stacked within a stator frame, and then secured into position by a variety of techniques. Where possible, the stator core is assembled vertically, so that gravity can be used to aid in stacking the core. Additionally, it has been found that pre-assembling some laminations into lamination groups, called donuts, also aids in the stacking of the stator core. It is not always possible, however, to assemble a stator core vertically. For example, existing power generators need to have their stator cores periodically replaced. The old core is removed and the new core needs to be stacked horizontally, since the pre-existing stator frame is immobile. This is an extremely time consuming effort that causes the power generator to be off-line for extended periods of time.

The present invention allows for a new stator core, either partially or fully assembled, to be shipped to the desired location. The container that the stator core is shipped in provides a support structure similar to a stator frame. When on location, the container is aligned with the existing stator frame, and the stator core is slid from the container into the stator frame. The entire stator core may be transferred in this manner, or sections of the core may be transferred at a time. The partially assembled core is either contained within a single container, or optionally contained within multiple containers. When the new stator core comprises multiple donuts divided into multiple containers, the containers may be placed on either side of a stator frame so that the new stator core may be assembled from both sides at the same time.

Since having existing power generators off-line is wasteful of resources, stator cores can be placed into the containers ahead of time. The pre-assembled core can then be sent to the desired location before the old core is removed, saving vast amounts of time. In this manner, power generators may be modernized more easily as well. In the past, operators have been reluctant to replace old cores with newer, more efficient cores since such a replacement would mean that the power generators would be off-line for an extended period of time. The present invention greatly reduced potential down-time, making such modernizations feasible. Although the present invention is ideally suited for the replacement of old stator cores in pre-existing power generators, it is equally applicable for the assembly of new power generators as well.

When stator cores are assembled horizontally, quality is difficult to maintain. This is due to the difficulty of placing the large number of unwieldy laminations properly into position. However, with the present invention, the core is either fully or partially pre-assembled, improving the quality of the new stator core.

The pre-assembled core, whether fully pre-assembled or pre-assembled into sectional donuts, can be stacked either inside of or outside of the container. Since the container is mobile, the laminations can be stacked within the container vertically. It may still, however, be desired to stack the stator core outside of the container, and then transfer it to the container for transportation to the stator frame location.

The container may be aligned by a variety of techniques. For example, a vertical flange on the end of a generator where the bearing brackets are bolted on would have a mating flange on the container that could be bolted to the vertical flange on the generator. Other examples include markings on the container, instruments and other types of physical guides.

Figure 2:
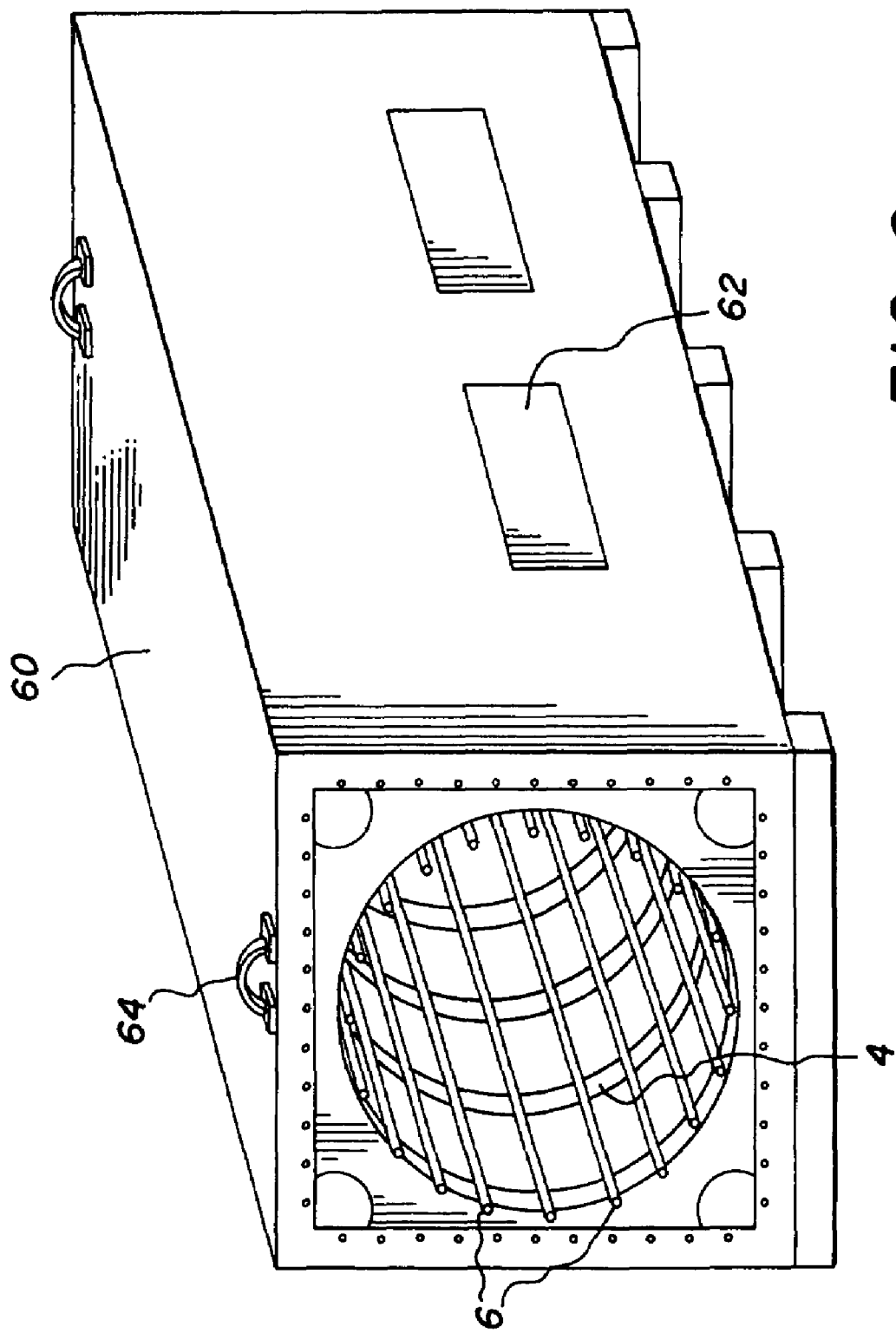
FIG. 2 illustrates a container according to one embodiment of the present invention.

For example, a cable is attached to the stator core that would run through the frame to a turning block on the opposite side. An overhead would be used to pull on the cable and the stator core. Other methods include a push-pull arrangement, that can be done either manually or hydraulically. The push-pull arrangement can use the aid of a beam or other type of physical device. Further, the push-pull arrangement can be an integral part of the container design As illustrated in FIG. 1, a standard stator frame 2 comprises support rings 4 and keybars 6. The keybars 6 engage the outer periphery of the laminations, helping to hold them in position. In FIG. 2, one embodiment of a container 60 is shown. The container 60 holds a pre-assembled stator core or portions thereof. Similar to a stator frame, the container has a mechanism for supporting the stator core, in this embodiment it is support rings 4 and keybars 6. The container 60 may also have end cover panels (not shown) and access panels 62. The access panels 62 can be used to check on the status of the stator core within, and/or to aid in the stacking to the stator core. The container may also have hooks or handles 64 to aid in the lifting or tilting of the container.

Figure 3:
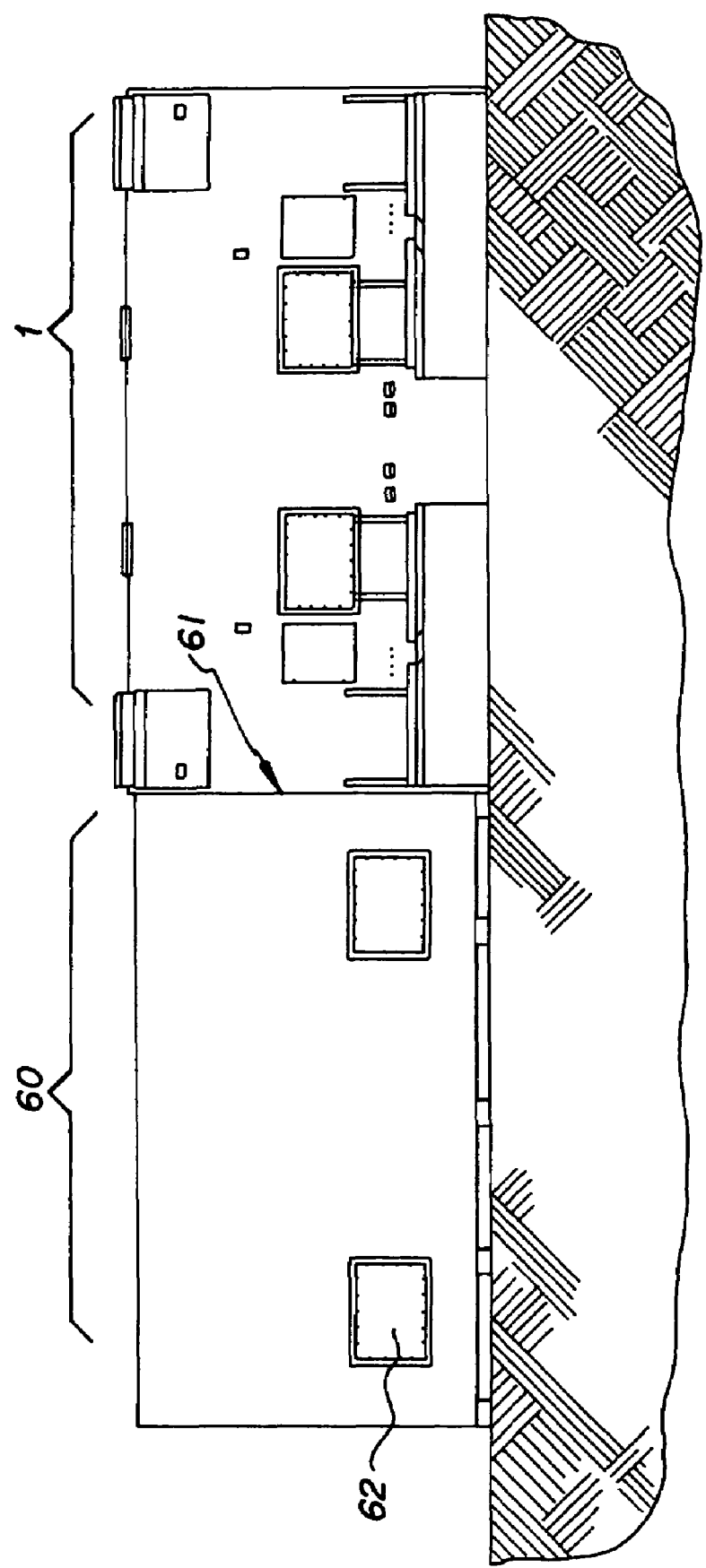
FIG. 3 illustrates a container being aligned with an existing power generator in accordance with one embodiment of the present invention.

Once the stator core, or a portion thereof, is assembled or partially assembled within the container, the entire container is aligned with a power generator, as shown in FIG. 3. In the embodiment shown, a container 60 containing a fully assembled stator core is aligned with an existing power generator 1. The container 60 is secured against the generator 1 forming a tight seem 61. Preferably the two are further connected by physical means, such as screws, hooks, dove-tailing, temporary welds and similar techniques.

Figure 4:
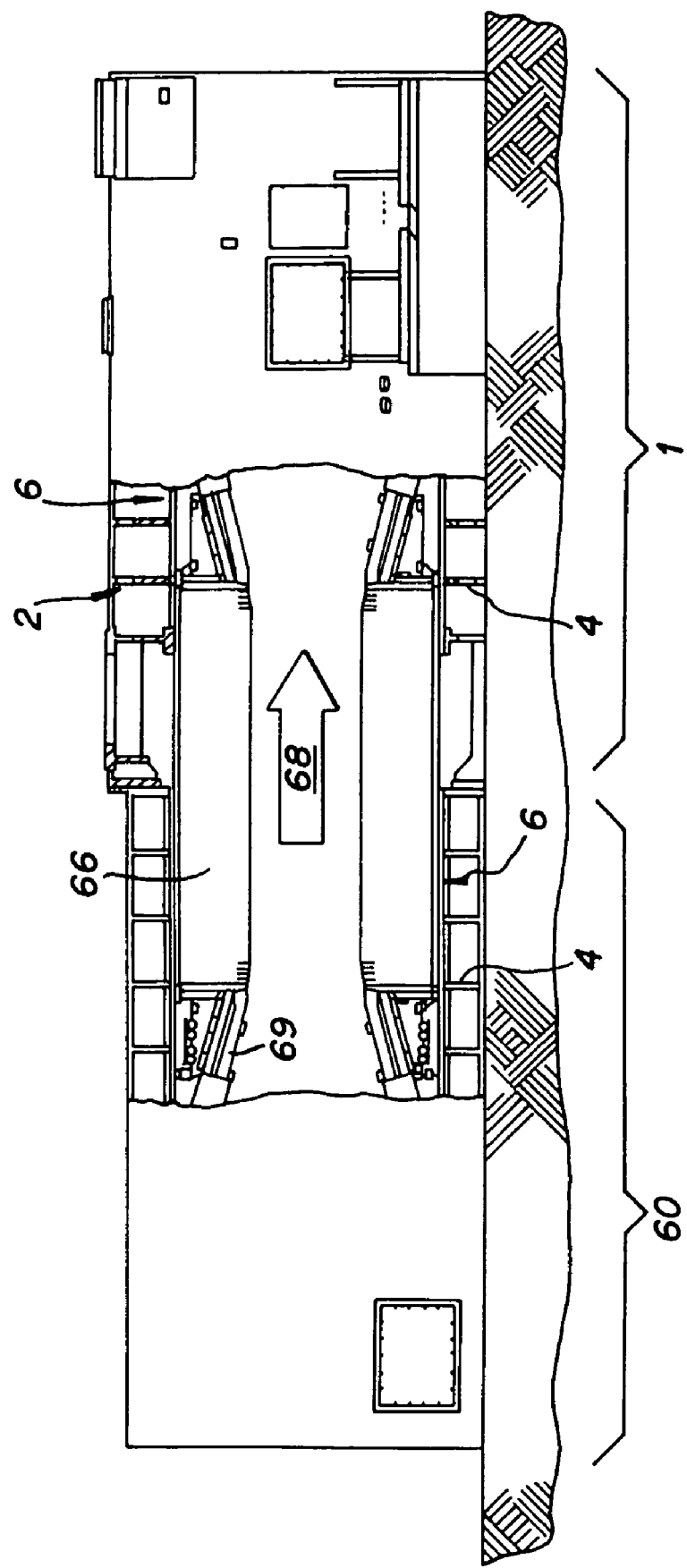
FIG. 4 illustrates the horizontal transfer of a fully assembled stator core from a container to an existing power generator in accordance with one embodiment of the present invention.

Referring to FIG. 4, the transfer of a fully assembled stator core 66 is illustrated. The core 66 is slid laterally 68 along the keybars 6 in the container 60. The core 66 then engages the keybars 6 in the stator frame 2. Once the stator core 66 is fully within the stator frame 2, the container 60 can be removed.

Advantageous to a fully assembled stator core 66 include that windings 69 and other core components can be pre-assembled with the rest of the core. However, the present invention is also applicable to partially assembled stator cores. The core may be partially assembled within a single container, or may be divided into multiple containers.

The transfer of the core, or portions thereof, from the container to the new stator frame may be accomplished by a variety of techniques. Two of these techniques are detailed in patent applications Horizontal Assembly of Stator Core using Keybar Extensions, by Sargeant et al., and Horizontal Assembly of Stator Core using a Central Rail Structure by Majernik et al., which are incorporated herein by reference. These applications teach methods and apparatus of using central rail structures and keybar extensions to transfer and place laminations and donuts. The central rail structure and the keybar extensions, either independently or in conjunction, may be used with the present invention.

Additionally, the related patent application Method and Apparatus for the Mounting of and Circumferential Displacement of Radial Forces in a Stator Core Assembly, by Sargeant et al., which is incorporated herein by reference, teaches the used of expanded grooves in laminations for accepting keybars, and using certain wedges in the expanded grooves to circumferentially displace radial forces from guard rings. The expanded grooves in use with the present invention will facilitate the transfer of the core from the container to the new stator frame. Slide pads, disclosed in the related application, will also facilitate the transfer of the core In one embodiment the present invention provides for a method of installing a stator core in a power generator that comprises assembling the stator core inside of a container, and then moving the container to the power generator. The container is horizontally aligned with the power generator, and the stator core is transferred from the container to the power generator.

In a related embodiment, the stator core is assembled vertically inside of the container. This may be done in a remote location, or on-site. In one embodiment the assembled core is a replacement core, and in another embodiment it is an original core for a power generator. In a different embodiment, the container is used to remove an old stator core, and the same or similar container is used to install the replacement core.

In a particular embodiment, the container has access panels. In another embodiment the container has support rings, end covers, and external hooking members. Support rings apply radial force to the keybars inside of the container, forcing the keybars more securely into the laminations inside. End covers protect and contain the core while shipping. The container is also provided with external hooking members. These allow for the container to be more easily shipped.

In another embodiment, stator cores are assembled outside of the container, and then placed inside for shipping to the power generator. In another embodiment of the present invention, partial stator cores are installed or assembled inside of the container. Partial stator cores refer to anything less and a complete stator core, and include laminations and donuts. A stator core refers to a stator core that has a complete allotment of laminations. A fully assembled stator core refers to a stator core that has additional elements assembled, such as windings.

In another particular embodiment, partial stator cores are divided into multiple shipping containers. In a related embodiment, the multiple shipping containers are horizontally aligned at both ends of a stator frame, and the stator core is assembled from both ends of the stator frame.

In another embodiment keybar extensions provide support for stator cores and/or partial stator cores as they are transferred from the container to the stator frame. In another embodiment a central rail structure proves support for stator cores and/or partial stator cores as they are transferred from the container to the stator frame. In a related embodiments both keybar extensions and a central rail structure are used.

In another embodiment, the present invention provides for an apparatus for the horizontal placement of a stator core within a stator frame. This apparatus comprises a container. The container comprises an internal space capable of holding the stator core, and multiple keybars arraigned along the internal space capable of securing the stator core within the internal space. The container is capable of being aligned with a stator frame and the stator core that is disposed within the container is horizontally transferable to the stator frame.

In a particular embodiment, the apparatus further comprises keybar extensions, where the keybar extensions bridge the container and the stator frame. In another particular embodiment a central rail structure is provided, where the central rail structure is capable of supporting and aiding in the movement of at least one of laminations, donuts and a stator core within the container. In a related embodiment, the apparatus further comprises both a central rail structure and keybar extensions.

In a particular embodiment, the apparatus further comprises support rings, where the support rings are capable of applying a radial pressure to the multiple keybars. In another particular embodiment, the apparatus further comprises external hooking members for aiding in the transport of the container. In still another particular embodiment donuts and stator cores are capable of being assembled within the container.

In another particular embodiment the apparatus is capable of receiving a stator core horizontally from a stator frame. In another embodiment the apparatus is capable of receiving partial stator cores from a stator frame.

Though the present invention is discussed in primarily in terms of use in stator core, the invention is not limited to this, and other areas of art may also benefit. Some of these other areas include, installation of other components such as rotors and end-winding cones.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

We claim:

1. A method of installing a stator core in a power generator comprising:
    assembling said stator core inside of a container;
    moving said container to said power generator;
    horizontally aligning said container with said power generator, wherein the aligning of said container is indicated by at least one of markings on said container, instruments on said container, and physical guides on said container; and
    transferring said stator core from said container to said power generator.

2. The method of claim 1, wherein the assembling of said stator core inside of said container is performed vertically.

3. The method of claim 1, wherein said container comprises access panels.

4. The method of claim 1, wherein said container comprises end coverings that are removed during the installation of said stator core into said power generator.

5. A method of installing a stator core in a power generator comprising:

installing at least a portion of a stator core inside of a container;

moving said container to said power generator;

horizontally aligning said container with said power generator, wherein the aligning of said container is indicated by at least one of markings on said container, instruments on said container, and physical guides on said container; and transferring said portion of a stator core from said container to said power generator.

6. The method of claim 5, wherein said portion of a stator core is a donut.

7. The method of claim 6, wherein a plurality of said containers are used to install said stator core.

8. The method of claim 5, wherein said portion of a stator core is a fully assembled stator core.

9. The method of claim 5, wherein said portion of a stator core is assembled inside of said container.

10. The method of claim 5, further comprising providing keybar extensions, where said keybar extensions provide support to said portion of a stator core while said portion of a stator core is being moved.

11. The method of claim 5, further comprising providing a central rail structure, where said central rail structure provides support to said portion of a stator core while said portion of a stator core is being moved.

* * * * *